H. J. Case.

Mechanical Movement.

No. 4,078. Reissued Jul. 26, 1870.

Witnesses: Joe. J. Peyton
John J. Chew

Inventor:
Henry J. Case
by his Atty
Wm. C. Baldwin

N. PETERS, PHOTO-LITHOGRAPHER, WASHINGTON, D. C.

United States Patent Office.

HENRY J. CASE, NELSON CHAPIN, AND CHARLES RICHARDSON, OF AUBURN, NEW YORK, ASSIGNEES OF HENRY J. CASE.

*Letters Patent No.* 89,026, *dated April* 20, 1869; *reissue No.* 4,078, *dated July* 26, 1870.

IMPROVEMENT IN MECHANICAL MOVEMENT.

The Schedule referred to in these Letters Patent and making part of the same

*To all whom it may concern:*

Be it known that HENRY J. CASE, of Auburn, in the county of Cayuga and State of New York, did invent certain new and useful Improvements in Mechanical Movement, of which the following is a full, clear, and exact description.

The object of the invention is to produce a simple, effective mechanical movement, for driving sewing-machines, turning-lathes, and other machines, which will prove less fatiguing to the muscles than the treadle-powers now generally used for this purpose.

The improvement herein claimed consists in a novel method of rotating the band-wheel or driving-wheel by means of two cranks, each connected, by a link-rod, with a vibrating arm on a rock-shaft, worked by an oscillating pedal or pendulum, each system of pedals, rock-shafts, and vibrating arms being independent of the other.

By this mode of construction the operator is enabled to drive the machine by a horizontal swinging motion of the foot, instead of the usual vertical movement, which is believed to be much more fatiguing to the muscles.

The improvement also consists in bending or curving the above-mentioned pendulums in such manner that provision is made for the knees and clothing of the operator, so that the pendulum may be suspended at a convenient point upon the under side of the table, and the foot-rest be brought within convenient reach of the operator, while, at the same time, the central portion of said pendulum shall not come in contact with the person or clothing of the operator.

The improvement further consists in a novel method of combining a swinging foot-rest with an oscillating pendulum-pedal, as hereinafter set forth.

In the accompanying drawing, which makes part of this specification—

A table or frame, A, to support the mechanism, is mounted on suitable legs B.

Pedals or pendulums C C′ are secured to studs $c$ $c^1$, on independent rock-shafts D D′, by means of set-screws $c^2$, passing through slots in pedals. By this means the pedals can be raised or lowered, to suit operators of different heights.

The lower part of each pendulum is forked, and a shoe or foot-rest, I, is pivoted in a stirrup, $i$, so as to oscillate vertically in its bearings, thus relieving the muscles of the operator.

Figure 1:
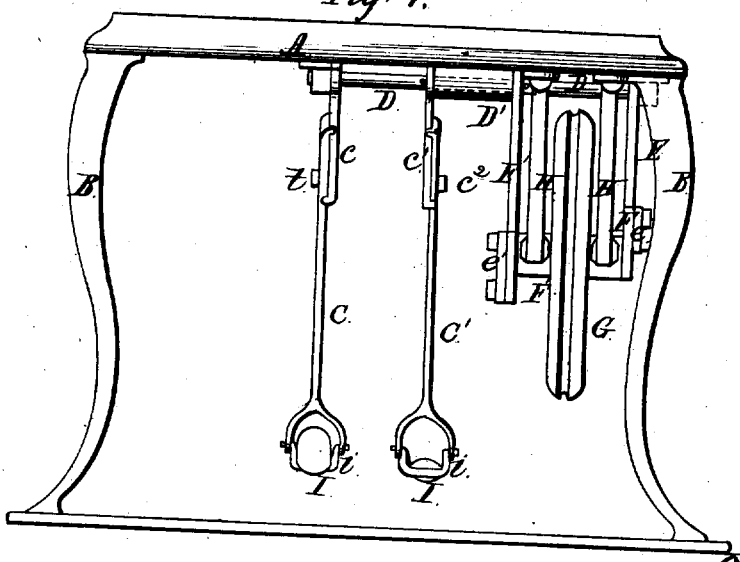
Figure 1 represents a view, in elevation, of the improvement, as seen from the front.
Figure 2:
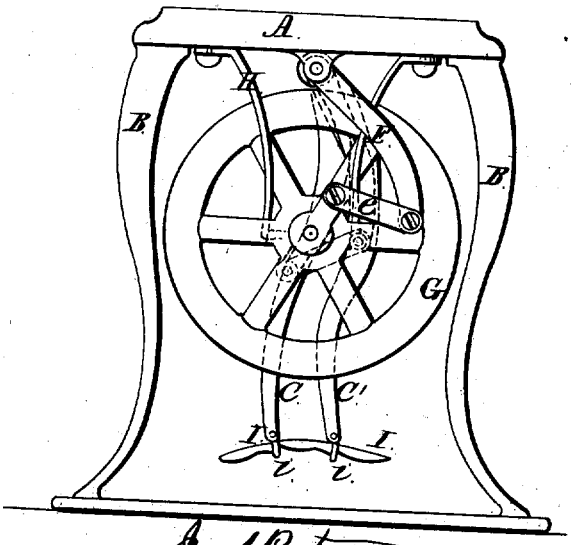
Figure 2 represents a similar view of the same, as seen from one side.

In figs. 1 and 2 the shaft D is shown as passing through the other one, D′, which is made tubular for this purpose, so that each can move independently of the other.

The shaft D extends beyond the driving-wheel G, and carries a fixed arm, E.

A link, $e$, is pin-jointed on the lower end of this arm, and on a crank, F, on the shaft of the driving-wheel G, which turns in suitable brackets H under the table.

The shaft D′, in like manner, is connected with the wheel by its arm E′, link $e'$, and crank F′.

It is preferred to arrange the cranks at a slight angle to each other, instead of diametrically opposite.

The operation of the machine will readily be understood.

The pedals are oscillated in alternately opposite directions, imparting a corresponding movement to the rock-shafts and vibrating arms E E′. These impart a continuous rotary movement to the driving-wheel, through the links $e$ $e'$ and cranks F F′.

Figure 3:
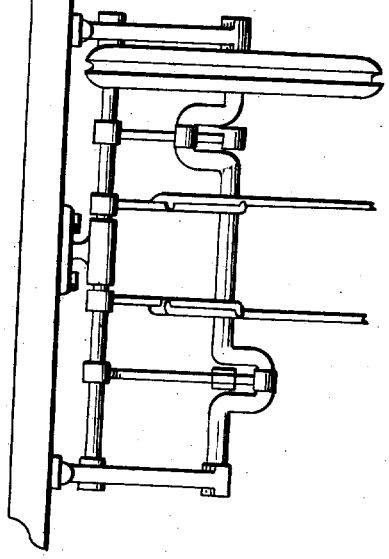
Figure 3 is a view similar to fig. 1, showing a modification of the invention.

In fig. 3 it will be seen that both cranks are arranged on the same side of the driving-wheel, and the rock-shafts as arranged in line, but not passing through each other. The operation, however, is the same in either case.

Two shafts might also be arranged parallel to each other, but not in the same line, and yet work well.

The wheel can be rotated with one pedal only, but the motion is not so uniform as when both are employed.

Having now described the invention,

What is claimed as the invention of HENRY J. CASE is—

1. A pendent curved or bent oscillating pendulum-pedal, as described, operating as and for the purpose set forth.

2. The combination, in a mechanical movement for sewing-machines, of a crank-shaft with a pendent curved or bent oscillating pendulum-pedal, for operating said shaft through connecting-devices, substantially as set forth.

3. The combination, as set forth, with an oscillating pendulum-pedal, of the rocking foot-rest.

HENRY J. CASE. [L. S.]
NELSON CHAPIN. [L. S.]
CHAS. RICHARDSON. [L. S.]

Witnesses:
CHAS. J. STUPP,
CHAS. F. DURSTON.